Jan. 13, 1942.  L. B. NEIGHBOUR  2,269,546
ADJUSTABLE V-BELT PULLEY
Filed Sept. 12, 1940
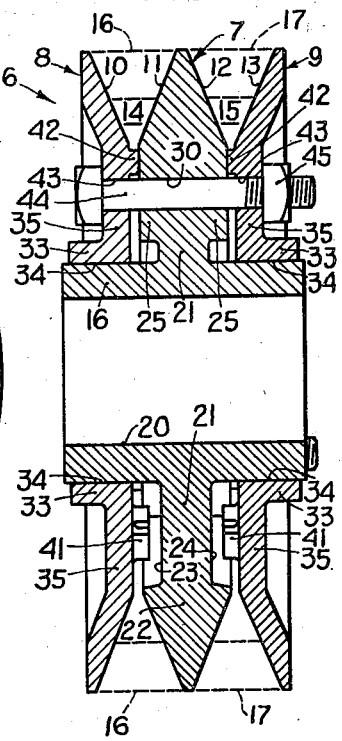
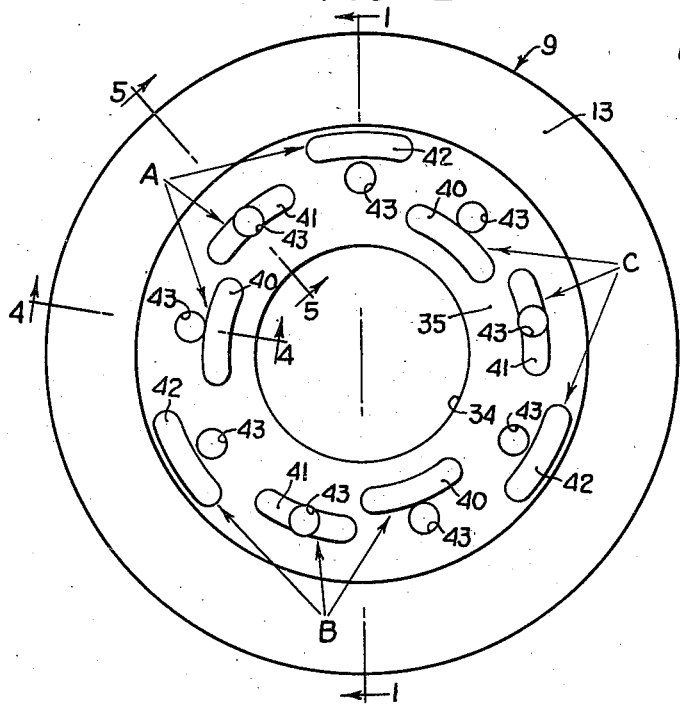
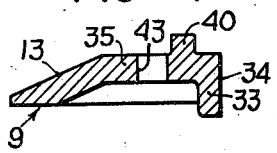
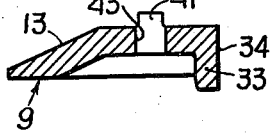
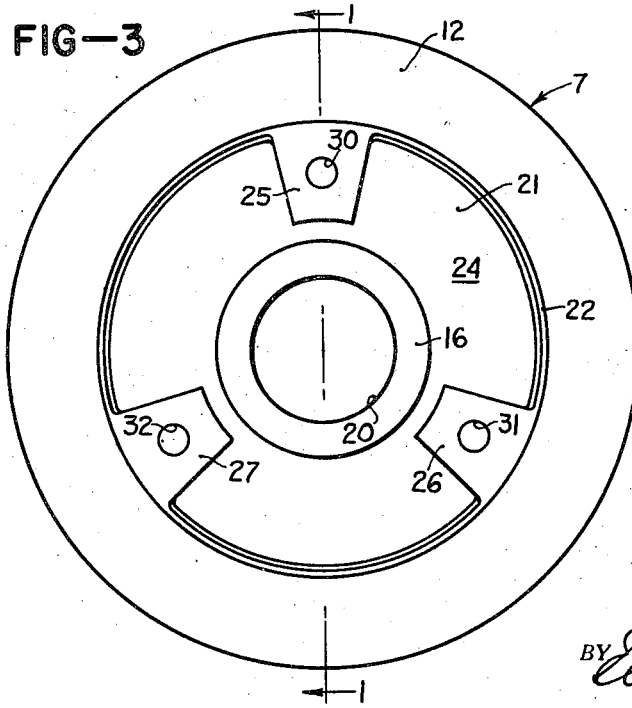
INVENTOR:
LEONARD B. NEIGHBOUR
BY
ATTORNEYS.

Patented Jan. 13, 1942

2,269,546

UNITED STATES PATENT OFFICE 2,269,546

ADJUSTABLE V-BELT PULLEY

Leonard B. Neighbour, Moline, Ill., assignor to Deere & Company, Moline, Ill., a corporation of Illinois Application September 12, 1940, Serial No. 356,467

5 Claims. (Cl. 74—230.17)

The present invention relates to adjustable V-belt pulleys of the type comprising a pair of sections which are adjustable axially relative to one another to increase or decrease the effective diameter of the pulley.

The principal object of this invention is to provide a pulley which is readily adjustable to any of several predetermined positions to secure several effective diameters, and which is positively held in the selected position.

Another object is to provide a simple, inexpensive adjustable pulley which can be manufactured at low cost and with a minimum of machine tool operations.

These and other objects and advantages of the present invention will become apparent after consideration of the following detailed description of the preferred embodiment thereof, reference being had to the accompanying drawing, in which Figure 1 is a vertical section, taken substantially along the line 1—1 in Figures 2 and 3, through a double-belt pulley embodying the principles of my invention, and showing the pulley adjusted for maximum effective diameter;

Figure 2 is an elevational view of one of the outer sections of the pulley;

Figure 3 is an elevational view of the center section;

Figure 4 is a section, taken along the line 4—4 in Figure 2; and

Figure 5 is a section, taken along the line 5—5 in Figure 2.

Referring now to the drawing, the pulley assembly is indicated in its entirety by the reference numeral 6, and comprises a center section 7 and a pair of outer sections 8 and 9 disposed on opposite sides of the center section and coaxial therewith. The sections 7, 8, 9 are provided with opposed inclined or cone-shaped working faces 10, 11, 12 and 13 which cooperate to provide a pair of V-grooves 14, 15 adapted to receive V-belts 16 and 17, and the outer sections 8, 9 are movable axially with respect to the center section 7, as will be described in detail presently, to increase or decrease the effective diameter of the grooves 14, 15.

The center section 7 is preferably in the form of a casting, and consists of a sleeve or hub 16 having a central aperture 20 adapted to receive the driving or driven shaft of the mechanism with which the pulley is to be used. A web portion 21 extends radially outwardly from the mid-point of the hub 16 and has an axially enlarged portion 22 near its peripheral edge, leaving annular recesses 23 and 24 on opposite sides of the center section. A plurality of symmetrically spaced, outwardly facing bearing pads 25, 26 and 27 are formed on each side of the web 21, with their bearing surfaces flush with and extending radially inwardly from the enlarged outer portion 22. Both holes 30, 31, and 32 extend axially through the centers of the bearing pads and are spaced equidistant from the axis of the section.

The two outer sections 8 and 9 are likewise preferably made of castings and are similar in most respects except that one of the sections might be termed "right-handed" while the other section is "left-handed," and description will, therefore, be directed to the one section 9 with the understanding that such description applies also to the other section 8. Like parts in the two sections are identified by the same reference numerals.

The outer section 9 has a hub 33 which is apertured at 34 to receive the hub 16 of the center section 7. A web 35 extends outwardly from the hub 33 and is turned axially outwardly and radially outwardly to form the conical working face 13. Formed on the inner side of the web 35 and extending axially toward the center section 7, is a plurality of stepped bosses arranged in three symmetrically spaced groups A, B and C of three bosses each. Each group of bosses is adapted to cooperate with one of the bearing pads 25, 26, 27 of the center section 7, and each group includes a high boss 40, an intermediate boss 41, and a low boss 42, arranged in concentric circles about the axis of the section, with the high boss 40 lying in the inside circle, the intermediate boss 41 lying in the intermediate circle, and the low bosses 42 lying in the outer circle. It is obvious that each group of bosses might include more than three bosses, or it might include only two, but it has been found that three bosses per group is satisfactory for most applications.

It will be noted that each of the concentric rings of bosses 40, 41, 42 is separated radially from its neighboring ring by a slight distance, and this, together with the arrangement of the rings successively increasing in height from the outside in toward the center, makes it possible to machine the sections with an extremely simple tool set-up. In the preferred set-up, the pulley section 9 is machined on a chucking lathe of the type wherein a tool is brought in from one side to face the outer ring of bosses first, and then the intermediate and inner rings of bosses in successive order, moving axially away from the section as it travels from one ring to the next to increase the height of the bosses. Other methods of machining the stepped bosses will occur to those skilled in the art, and the foregoing method is given merely to illustrate the simplicity of tool set-up necessary to produce the outer sections of the pulley.

The web 35 of the outer section is provided with a plurality of bolt holes 43 corresponding in number to the number of bosses and arranged in a circle so as to coincide with the bolt holes 30, 31, 32 in the center section 7. The bolt holes 43 are arranged with respect to the bosses so that when any three of the bolt holes 43 are registered with the bolts holes 30, 31, 32, the corresponding three bosses of the same height will contact the bearing surfaces 25, 26, 27, thereby spacing the outer section 9 away from the inner section 7 to provide one of the predetermined effective diameters for the pulley. The three sections 7, 8, 9 of the pulley are rigidly secured together to form a unitary structure by means of three bolts 44, which are passed through the aligned bolt holes in the pulley sections.

From the foregoing, it will be seen that the effective diameters of the pulley are predetermined by the heights of the bosses 40, 41, 42, and the effective diameter of the pulley is changed by removing the bolts 44 and rotating the outer sections 8, 9 with respect to the center section 7 so as to bring another of the rings of bosses into contact with the bearing pads 25, 26, 27. The bolts 44 are then replaced in the new group of aligned bolt holes, and are secured by nuts 45.

When the outside ring of low bosses 42 is in engagement with the bearing surfaces 25, 26, 27, the intermediate bosses 41 and high bosses 40 extend into the recesses 23 and 24 in the sides of the center section. Figure 1 shows the intermediate bosses 41 projecting into the recesses 23, 24.

It is believed that the operation of my invention will be clear from the foregoing description, and what I claim and desire to secure by Letters Patent is:

1. An adjustable pulley comprising a pair of coaxial sections having opposed inclined working faces, a plurality of bosses formed on the inner side of one of said sections and extending axially toward the other section, said bosses being of different height and spaced apart radially from one another to facilitate machining the faces thereof, a bearing surface on said other section selectively engageable with said bosses whereby said sections are spaced apart axially to provide a plurality of predetermined effective pulley diameters, and means for securing said sections together.

2. An adjustable pulley comprising a pair of coaxial sections having opposed inclined working faces, a plurality of groups of bosses formed on the inside of one of said sections and extending axially toward the other section, said groups being spaced angularly about the axis of said one section, and each group comprising a plurality of angularly and radially spaced bosses of varying height, a plurality of angularly spaced bearing surfaces provided on said other section and disposed one to each group of bosses, said bearing surfaces being selectively engageable with the bosses in each group of the same height whereby said sections are spaced apart axially to provide a predetermined effective pulley diameter, and means for securing said sections together.

3. An adjustable pulley comprising a pair of coaxial sections having opposed inclined working faces, a plurality of groups of bosses formed on the inside of one of said sections and extending axially toward the other section, said groups being spaced angularly about the axis of said one section, and each group comprising a plurality of angularly and radially spaced bosses of varying height, a plurality of angularly spaced bearing surfaces provided on said other section and disposed one to each group of bosses, said pulley sections being rotatable relative to one another to selectively engage said bearing surfaces with the bosses in each group of the same height thereby providing a plurality of effective pulley diameters corresponding in number to the number of bosses in each of said groups.

4. An adjustable pulley comprising a pair of coaxial sections having opposed inclined working faces, a plurality of axially extending bosses formed on the inside of one of said sections and arranged in concentric circles about the axis of the section, the bosses in each of said circles being of the same height, and each of said circles of bosses being at a different height with respect to the other circles, bearing means on the other of said sections selectively engageable with one circle of bosses at a time, and means for securing said sections together.

5. An adjustable pulley comprising a pair of coaxial sections having opposed inclined working faces, a plurality of axially extending bosses formed on the inside of one of said sections and arranged in concentric circles about the axis of the section, the inner circle of bosses being the highest, and succeeding circles of bosses diminishing in height as the circles increase in diameter, bearing means on the other of said pulley sections engageable with one circle of bosses at a time, said pulley sections being movable relative to one another to a plurality of angularly spaced positions wherein said bearing means is engaged with one or another circle of bosses, and means for securing said pulley sections together in one of said positions.

LEONARD B. NEIGHBOUR.